United States Patent
Dakshinkar et al.

(10) Patent No.: US 11,375,451 B2
(45) Date of Patent: Jun. 28, 2022

(54) TARGET WAKE TIME SYNCHRONIZATION ACROSS VIRTUAL ACCESS POINTS

(71) Applicant: HEWLETT PACKARD ENTERPRISE DEVELOPMENT LP, Houston, TX (US)

(72) Inventors: Abhiruchi Dakshinkar, Santa Clara, CA (US); Gaurav Patwardhan, Santa Clara, CA (US); Mohd Shahnawaz Siraj, Santa Clara, CA (US); Sachin Ganu, Santa Clara, CA (US); Eldad Perahia, Park City, UT (US); Nitin Changlani, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/062,494

(22) Filed: Oct. 2, 2020

(65) Prior Publication Data
US 2022/0110052 A1   Apr. 7, 2022

(51) Int. Cl.
*H04W 52/02* (2009.01)
(52) U.S. Cl.
CPC .............................. *H04W 52/0206* (2013.01)

(58) Field of Classification Search
CPC .................................................. H04W 52/0206
USPC .......................................................... 370/311
See application file for complete search history.

(56) References Cited

U.S. PATENT DOCUMENTS

| | | | |
|---|---|---|---|
| 2019/0045438 A1* | 2/2019 | Cariou | H04W 52/0219 |
| 2019/0253968 A1* | 8/2019 | Xiao | H04W 28/0205 |
| 2019/0306790 A1* | 10/2019 | Kottontavida | H04W 72/1252 |
| 2020/0137690 A1* | 4/2020 | Min | H04W 28/18 |

* cited by examiner

*Primary Examiner* — Gbemileke J Onamuti
(74) *Attorney, Agent, or Firm* — Sheppard Mullin Richter & Hampton LLP

(57) ABSTRACT

The full efficiency gains of the Target Wake Time (TWT) mechanism specified in the 802.11ax standard may not be realized when stations associated to an access point (AP) are spread across multiple Base Station Service Identifiers (BSSIDs). In such a scenario, TWT as conventionally utilized/specified in the 802.11ax standard, cannot properly coordinate sleep/wake schedules for stations due to associating to different BSSIDs. Accordingly, various embodiments are directed to grouping stations associated to multiple BSSIDs of an AP to allow for the synchronization (or staggering) of TWT, and facilitate multi-user transmissions, both in the uplink and downlink directions.

20 Claims, 9 Drawing Sheets

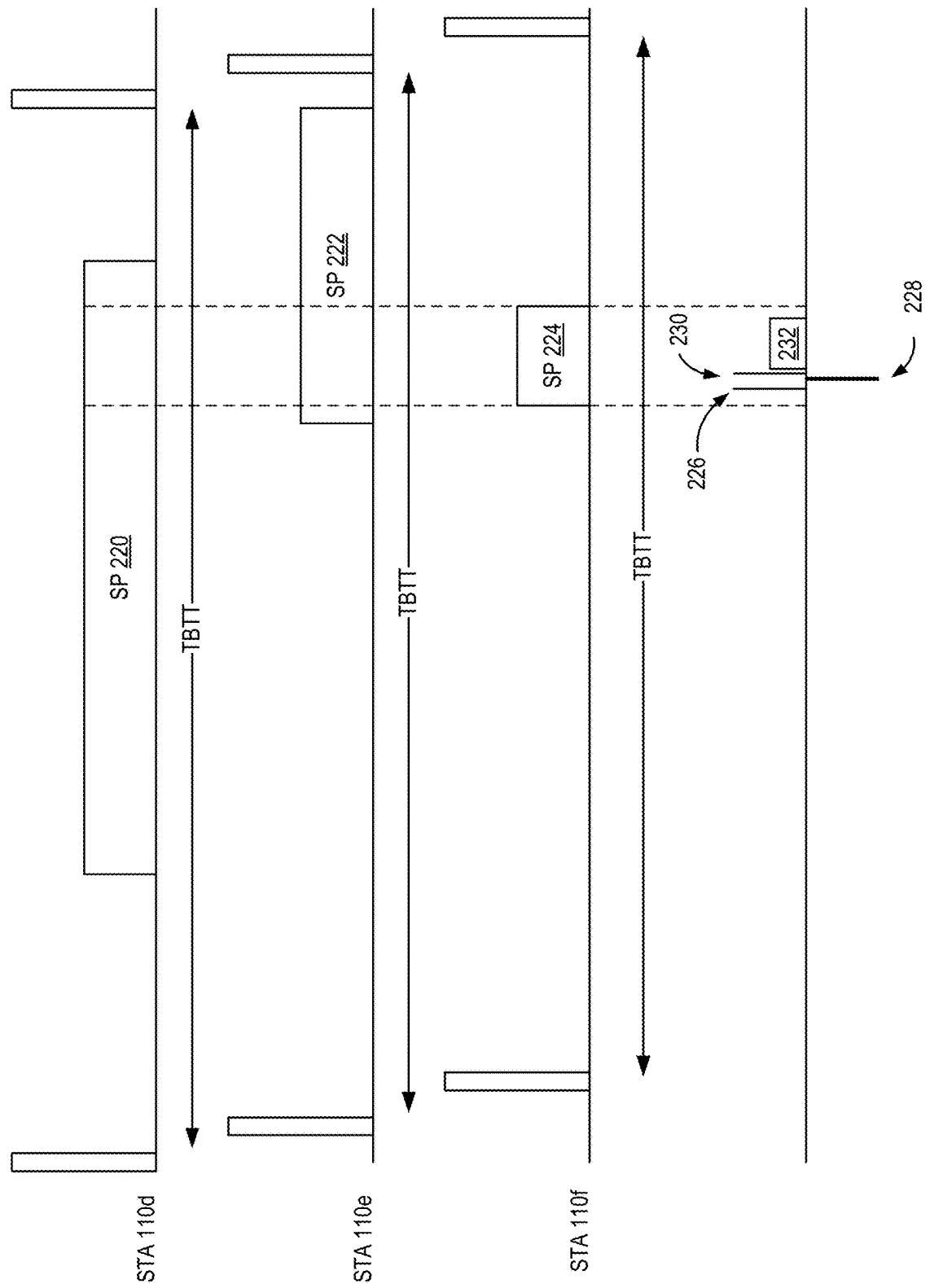

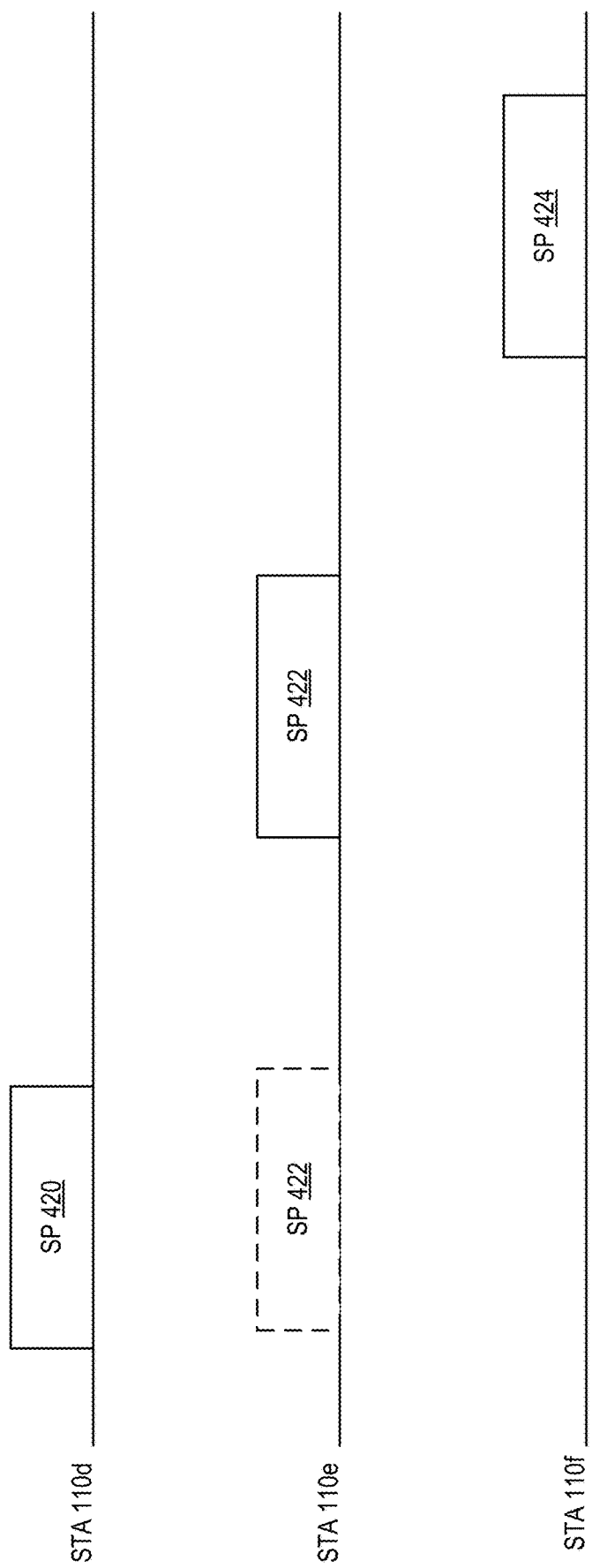

TARGET WAKE TIME SYNCHRONIZATION ACROSS VIRTUAL ACCESS POINTS

DESCRIPTION OF RELATED ART

In some computing networks, access points (APs) may provide network connectivity to client devices. As density increases in wireless networks, the risk of contention and overlap between transmissions from multiple stations to and from an AP increases. Several approaches have been developed to address these issues through each evolution of wireless communications protocols. One way to reduce contention and increase spectral efficiency is to schedule when connected stations communicate with an AP.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2B is an example representation of synchronized TWT in accordance with one embodiment.

FIG. 4B is an example representation of synchronized TWT in accordance with one embodiment.

Figure 1A:
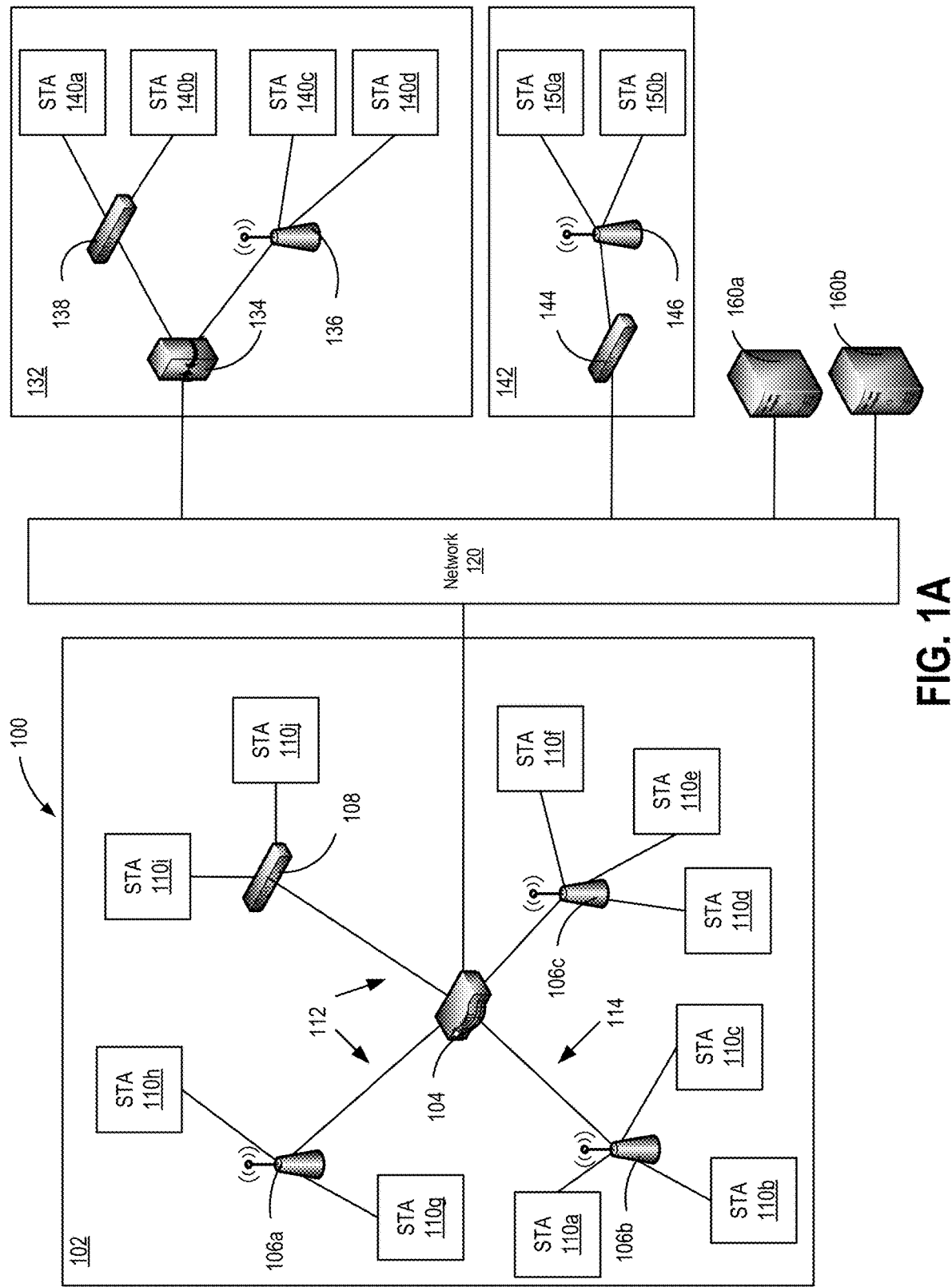
FIG. 1A illustrates an example wireless network deployment in which synchronized TWT can be implemented in accordance with various embodiments.

The figures are not exhaustive and do not limit the present disclosure to the precise form disclosed.

DETAILED DESCRIPTION

An example method of improving spectral efficiency within IEEE 802.11ax (referred to as Wi-Fi 6) can be referred to as the Target Wake Time (TWT) mechanism. TWT allows an access point (AP) in a wireless communications network to manage activity in order to minimize contention between connected devices, also referred to as stations (STAs). TWT can be achieved by allocating/scheduling STAs to operate during certain times/over certain time periods and/or frequencies, and to concentrate the frame exchanges between a STA and an AP during predefined service periods (SPs). The use of TWT may also reduce the amount of time a STA needs to be awake. Thus, in addition to reducing contention, TWT may also reduce STA power consumption by enabling STAs to enter a sleep mode during periods when it is not scheduled to communicate with the AP. Previously, STAs would be required to periodically wake up from sleep mode to wait for/receive beacons.

APs may advertise wireless local area networks (WLANs) to STAs by sending out beacons and probe responses that contain a WLAN's Service Set Identifier (SSID), as well as, e.g., supported authentication and data rates. When a STA associates to an AP, that STA sends traffic to the AP's Basic SSID (BSSID), which typically is the AP's Media Access Control (MAC) address. In some networks, an AP may use a unique BSSID for each WLAN allowing a single, physical AP to support multiple WLANs. A WLAN configuration applied to a BSSID of an AP can be referred to as a virtual AP (VAP). In other words, a VAP may be thought of as a logical or a virtual AP instance on a physical AP. VAPs or VAP profiles can be configured to provide different network access or services to users on/across the same physical network. For example, a first WLAN may be configured to provide access to guest users and a second WLAN can be configured to provide access to employee users through the same AP(s). Each of the first and second WLAN configurations applied to different BSSIDs result in first and second VAPs. For example, a VAP can be configured to offer open authentication and Captive Portal access with data rates of 1 and 2 Mbps, while another VAP can be configured to require WPA authentication with data rates of up to 11 Mbps.

In the context of VAPs, the full efficiency gains of TWT may not be realized when STAs associated to an AP are spread across multiple VAPs/BSSIDs. For example, an AP may operate or present itself to STAs as multiple APs or VAPs, where sets of STAs can associate to each of the VAPs. In such a scenario, TWT as conventionally utilized/as specified in the 802.11ax standard, cannot properly coordinate sleep/wake schedules for STAs due to associating to different VAPs. Accordingly, various embodiments are directed to grouping STAs associated to multiple BSSIDs of an AP to further improve the efficiency of TWT, and facilitate MU-MIMO and Orthogonal Frequency Division Multiple Access (OFDMA) transmissions, both in the uplink (UL) and downlink (DL) directions.

Different strategies may be used to synchronize TWT agreements to allow STAs to be grouped across different BSSIDs of an AP: (1) STAs having similar wake up characteristics/TWT service period (SP) durations across multiple BSSIDs can be grouped together and provided with a TWT agreement that allows for simultaneous transmission/receipt of packets (overlapping SPs); (2) TWT SP can be staggered in time, so, although STAs across different BSSIDs are not "grouped" as in (1), STAs of a BSSID can be grouped such that they adhere to TWT agreements that do not overlap (avoiding contention). It should be understood that synchronization can refer to different manners of coordinating TWT mechanisms/actions. For example, in some embodiments, synchronization of TWT agreements can refer to having TWT parameters that overlap or are common/approximately common amongst two or more STAs or groups of STAs across different VAPs. In some embodiments, synchronization can refer to timing TWT to avoid contention, which in some cases, may involve staggering of TWT agreements/actions. It should also be noted that in some embodiments, and because TWT agreements can be negotiated in real-time, and STAs can move from one AP/VAP to another AP/VAP depending on location, mobility management (handovers), etc., groups of STAs can vary, where a STA may belong to a particular group of STAs for a particular time period to transmit/receive a frame(s), but may subsequently be grouped with another group of STAs for another time period to transmit/receive a different frame(s).

Once TWT agreements are synchronized, implementation or execution of the TWT agreements can vary according to the various operating modes associated with a TWT session (trigger-enabled and non trigger-enabled) according to which UL transmissions are scheduled. The TWT agreements can also vary according to whether a TWT session is announced or unannounced for DL transmissions. It should be understood that the TWT agreement is the final arrangement between an AP and STA (reached pursuant to negotiation of a TWT parameter set) defining details of the TWT SP to which the STA will belong, e.g., the time(s) at which the STA should wake up.

Before describing embodiments of the disclosed systems and methods in detail, it is useful to describe an example network installation with which these systems and methods might be implemented in various applications. FIG. 1A illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices/STAs 110a-j. Using a connection to a switch 108 or AP 106a-c, a STA 110a-j may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired STA 110*i-j*. STAs 110*i-j* may connect to the switch 108 and through the switch 108, may be able to access other devices within the network configuration 100. STAs 110*i-j* may also be able to access the network 120, through the switch 108. The STAs 110*i-j* may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for STAs 110a-h. Each of APs 106a-c may be a combination of hardware, software, and/or firmware that is configured to provide wireless network connectivity to wireless STAs 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

It should be noted that APs, such as AP 130, AP 132, and AP 134 are enabled to implement VAPs, namely, support for one or more multiple distinct SSID values over a single AP radio with unique media access control (MAC) addresses per SSID (i.e., BSSID). As is known, an SSID is a field between 0 and 32 octets that may be included as an Information Element (IE) within management frames. In the context of the 802.11 standard, management frames supporting the SSID IE include the beacon, probe request/response, and association/reassociation request frames. In one embodiment, an AP supports VAPs using multiple BSSIDs. Each beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. In one embodiment, an AP may advertise up to a given number (e.g., 16) of beacons, each with a different BSSID to provide the VAP support. Each VAP may have a unique MAC address, and each beacon may have a network name.

Figure 1B:
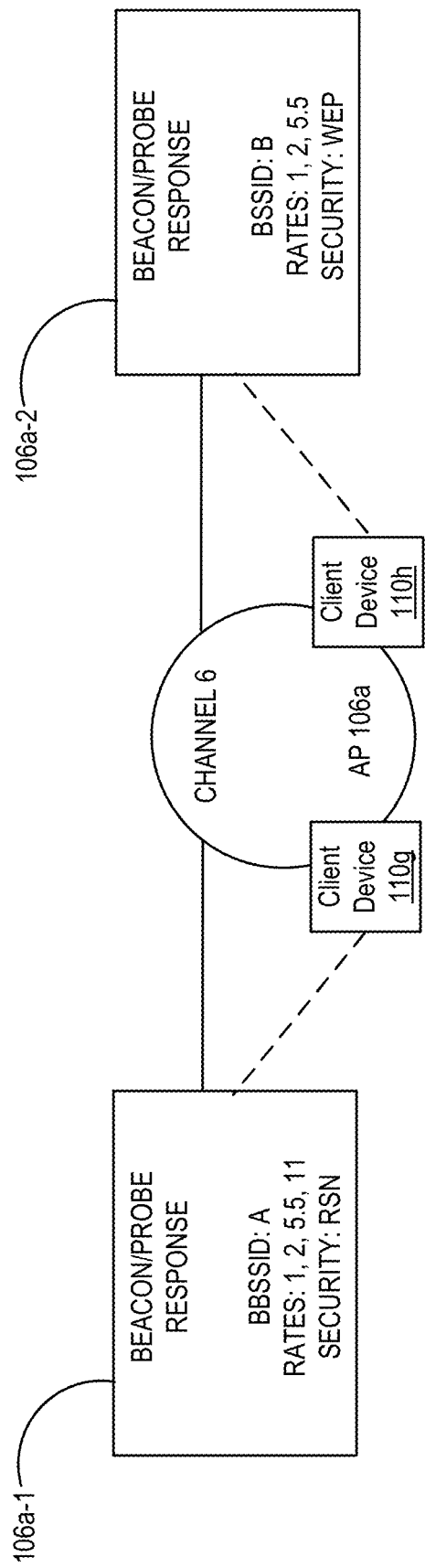
FIG. 1B illustrates an example multi-virtual access point configuration across which synchronized TWT can be implemented in accordance with various embodiments.

FIG. 1B is a schematic representation of an multi-VAP configured AP. AP 106a may be configured to support multiple VAPs 106a-1 and 106a-2. Each VAP 106a-1 and 106a-2 emulates the operation of physical AP 106a at the MAC layer. In particular, each VAP 106a-1 and 106a-2 emulates the MAC layer behavior of the physical AP 106a by operating with a distinct BSSID (A, B) and, optionally, distinct capability advertisements (e.g., rates 1, 2, 5.5, 11 for BSSID A, and rates 1, 2, 5.5 for BSSID B), and default key sets (Robust Security Network (RSN) for BSSID A and Wired Equivalent Privacy (WEP) for BSSID B). Each VAP 106a-1 and 106a-2 may also exhibit distinct application behavior (at the application layer), and be reachable via a distinct domain name (at the IP layer). To provide this support, it is assumed that STAs 110g and 110h can discover the SSIDs, that each VAP 106a-1 and 106a-2 can advertise its own set of capabilities, and that each VAP 106a-1 and 106a-2 can be allocated to a unique WLAN.

In a multi-VAP/BSSID scenario, where two or more VAPs are configured to operate on a physical AP, it is possible to collectively synchronize or stagger actual TWT instances across the multiple VAPs/BSSIDs, whether the TWT instances are individual TWT instances or broadcast TWT instances. Accordingly, in addition to improving STA power management, the TWT feature or mechanism can be leveraged to improve channel efficiency and capacity. For example, taking the example multi-VAP AP 106a, AP 106a can wake up multiple STAs (e.g., STAs 110g, 110h) at the same time, and synchronize the transmissions to and from STAs 110g and 110h, while facilitating more MU-MIMO and OFDMA transmissions and still avoid contention between STAs of different VAPs, e.g., STAs 110g and 110h. That is, transmissions from STAs that attach to different VAPs (and that do not interact/are not aware of each other) would typically result in contention when implementing TWT as currently/conventionally contemplated. For example, multiple STAs would typically contend for a single radio frequency (RF) medium, and transmissions from such STAs might collide if TWT is implemented on a per-VAP basis.

In order to initiate a TWT session in the context of individual TWT agreements, a negotiation phase typically occurs during which an AP and target STA agree to a common set of parameters, including, but not necessarily limited to TWT, TWT wake interval, and minimum/nominal TWT wake duration. It should be understood that the nominal TWT wake duration can indicate a minimum amount of time (in some units, e.g., μs) that the TWT-requesting STA expects it needs to be awake in order to complete frame exchanges associated with the TWT flow identifier for the period of the TWT wake interval. That is, the nominal TWT wake duration is a parameter that can be negotiated to arrive at an SP, and thus SP and nominal TWT wake duration can be the same. TWT can refer to the next time (e.g., in ms) at which the STA participating in a TWT-based communication should wake up for the TWT session. TWT wake interval can refer to the time interval between subsequent TWT sessions for a particular STA. Minimum TWT wake duration can refer to a minimum time duration during which a STA will stay awake (relative to a start time of a TWT session) so as to be able to receive frames from other STAs.

In the case of broadcast TWT agreements, an AP is allowed to establish a shared TWT session for a group of STAs (albeit in conventional implementations, again, the group of STAs cannot comprise STAs attached to different VAPs). The AP may periodically specify the TWT parameter set (TWT, TWT wake interval, minimum TWT wake duration, etc.) in beacon frames. STAs that are part of a broadcast TWT agreement wake up to receive beacons from the AP containing instructions for the broadcast TWT session(s) to which they belong. To request participation in a broadcast TWT agreement, a STA sends a TWT request to the AP. Similar to individual TWT agreements, STAs can request, suggest, or demand a particular TWT parameter set during a negotiation phase, and the AP can accept, reject, or propose an alternative setting(s). Once a common parameter set has been established, the participating STAs can go into sleep mode and wake up at the next scheduled SP. As is the case with individual TWT agreements, broadcast TWT agreements can establish TWT sessions that are trigger-enabled/non trigger-enabled, and can be implemented as announced or unannounced.

Moreover, a TWT session may be associated with two different operating modes, a trigger-enabled operating mode, and a non trigger-enabled operating mode. When a TWT session operates according to the trigger-enabled operating mode, an AP uses trigger frames to schedule STAs' transmissions. Hence, an AP and STA may have negotiated the above-noted parameters so that the STA is aware of the TWT, SP, and TWT wake interval. However, prior to transmitting any data/packets/frames in UL direction during a TWT session, the STA should first wait for a trigger from the AP. When a TWT session operates according to the non trigger-enabled operating mode, an AP need not send any trigger to a STA prior to the STA transmitting data. A STA may simply start contending on the medium with an intent to transmit data in the UL direction.

When a TWT session is established, it may be specified as being announced or unannounced. In the case of an announced TWT session, a STA must send a message(s) to the AP in order to receive data from the AP. That is, when a STA is out of sleep mode and needs to retrieve data from the VAP to which it is attached, the STA must first send a polling frame to the AP to initiate receipt of data from the AP. In the case of an unannounced TWT session, the AP need not wait for any polling frame(s) from a STA prior to transmitting data to the STA. As noted above, for individual TWT agreements, the AP and STA will have negotiated relevant TWT parameters, such as TWT. Accordingly, the STA will know when it should wake from sleep mode, and the AP assumes that the STA will be/is awake at the proper time to receive targeted for that STA.

Figure 2A:
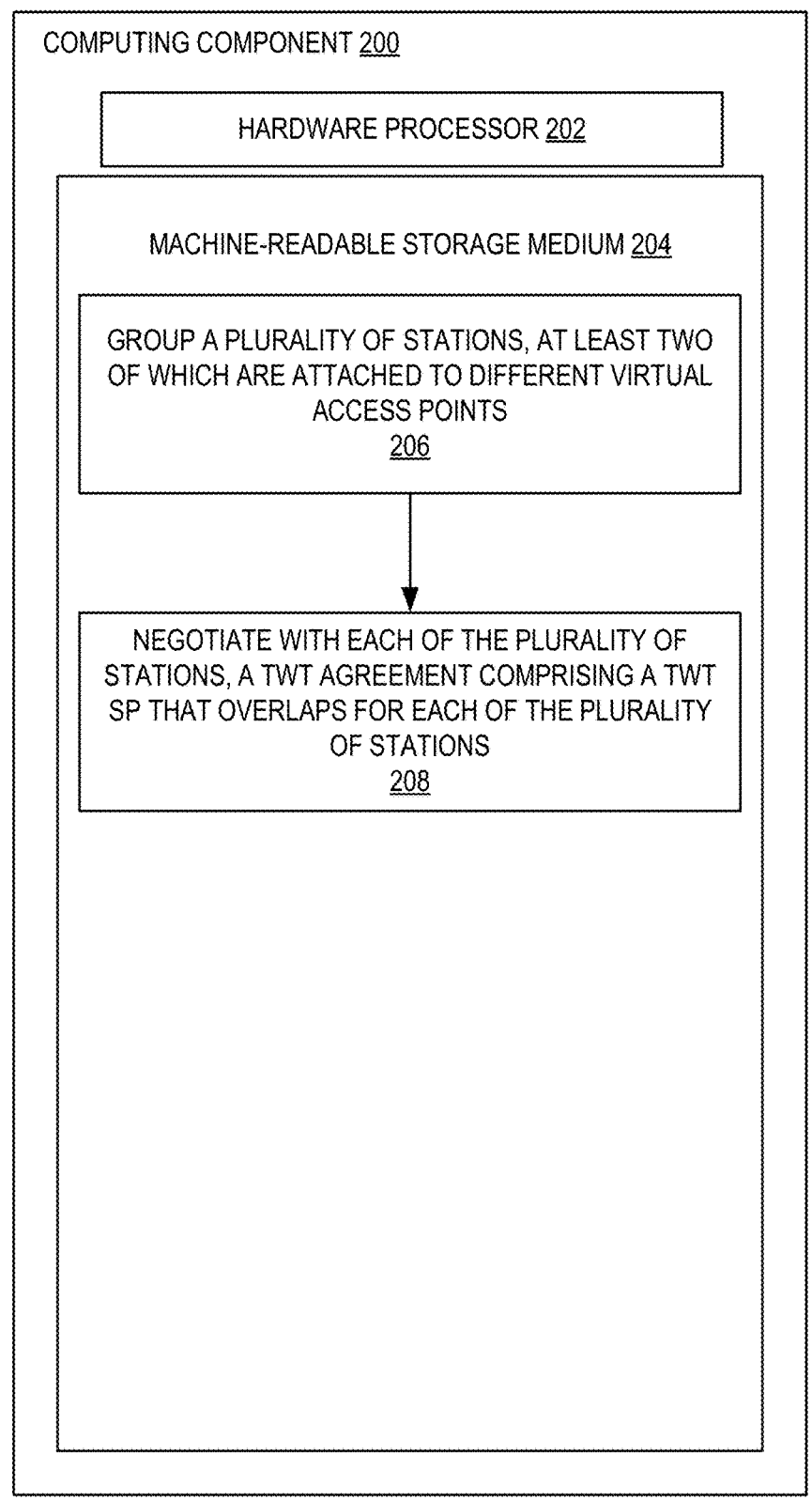
FIG. 2A illustrates an example computing component for effectuating synchronized TWT in accordance with one embodiment.

FIG. 2A is a block diagram of an example computing component or device 200 for synchronizing TWT agreements in accordance with one embodiment. Computing component 200 may be, for example, a server computer, a controller, or any other similar computing component capable of processing data. In the example implementation of FIG. 2A, computing component 200 includes a hardware processor, 202, and machine-readable storage medium, 204. In some embodiments, computing component 200 may be an embodiment of a controller, e.g., a controller such as controller 104 (FIG. 1A), or another component of wireless network 100, e.g., an AP such as AP 106a (FIG. 1A), for example.

Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-208, to control processes or operations for upgrading an AP. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 304 may be encoded with executable instructions, for example, instructions 206-208.

Hardware processor 202 may execute instruction 206 to group a plurality of stations, at least two of which are attached to different VAPs. In some embodiments, MU-MIMO is applied to grouped STAs across different BSSs, in accordance with systems and methods described in U.S. Pat. No. 10,193,510, which is incorporated herein by reference in its entirety. MU-MIMO provides a mechanism for a wireless network device, such as an AP, to transmit to multiple STAs at the same time. Without MU-MIMO enabled, the AP may have to transmit to each associated STA one at a time. With MU-MIMO, because the AP is able to transmit to multiple STAs at the same time, the AP is able to transmit more data more frequently. This can improve the rate of data being transmitted to some or all of the associated client devices. MU-MIMO is defined in the Institute of Electrical and Electronics Engineers (IEEE) 802.11 specification.

When employing MU-MIMO, an AP may group two or more STAs, and transmit beamformed signals to each group of STAs. MU-MIMO may be more efficient when a group of STAs that are to receive MU-MIMO transmissions are receiving frames with similar traffic characteristics. Because the AP is transmitting to all the STAs at the same time, the transmissions may be more efficient when the frames being transmitted are similar in size. Furthermore, the interval between MU-MIMO transmissions may be minimized when the AP receives incoming frames at about the same time. In the 802.11ax High Efficiency WLAN standard, one manner in which the aforementioned efficiency may be achieved is by scheduling MU transmissions for both downstream/DL (from an AP) and upstream/UL (from STAs) transmissions. As alluded to above, physical APs can be logically split into a plurality of VAPs. In some embodiments, MU-MIMO is applied to grouped STAs across different BSSs, in accordance with systems and methods described in U.S. Pat. No. 10,193,510, which is incorporated herein by reference in its entirety.

In the present context, an AP configured to operate as multiple VAPs provides service to STAs attached to different VAPs. Accordingly, the AP may maintain separate queues for frames destined for each STAs attached to a particular VAP. Moreover, feedback from a sounding process can be used determine how to group two or more STAs for receiving MU transmissions, as well as inform the AP how to shape a beamformed signal to a group of STAs. The type of STA traffic being transmitted/received may also be considered when grouping STAs. For example, similar traffic types may allow STAs transmitting/receiving such similar traffic types may be suited for grouping. For example, STAs running the same application may have the same/similar traffic pattern, and similar traffic patterns may be one example basis for grouping. For example, voice packets tend to be periodic in nature, and so the packet arrival rate for different STAs would nevertheless be the same. Thus, multiple voice calls may be combined into a group. Other types/manners of grouping STAs may be leveraged, and the above example is not meant to be limiting in any way.

Hardware processor 202 may execute instructions 208 to negotiate with each of the plurality of stations, a TWT agreement comprising a TWT SP that overlaps for each of the plurality of stations. In some embodiments, individual TWT agreements across different VAPS (and/or the same VAP) can be made to overlap. To facilitate this, relevant VAPs can create individual TWT arrangements through negotiating TWT parameters, e.g., TWT, minimum TWT duration, etc., that overlap. This enables possibility of simultaneous DL/UL transmissions to multiple STAs of the same VAP or across different VAPs. In this way, MU transmissions, for example, can be leveraged to accommodate STA traffic in the context of TWT, where multiple STAs can synchronously or simultaneously wake from respective sleep modes to transmit/receive data as needed using MU-MIMO and or MU-OFDMA techniques.

It should be noted that for scheduling trigger-based UL transmissions, an AP sends a trigger frame. This trigger frame can be a broadcast frame which contains information about those STAs which are part of a UL multi-user group. The trigger frame may also contain information regarding the time when the STAs are going to begin transmitting data/packets/frames to the AP, along with information about the transmit rate, transmit power, resource unit (RU) size and spatial streams allocated to each STA. The source address (SA) in a trigger frame refers to the BSSID of the VAP transmitting the trigger frame. Because an AP, in accordance with various embodiments, groups the clients (STAs) of multiple VAPs, the AP sends multiple trigger frames for each VAP. The STAs are supposed to respond within a Short Interframe Space (SIFS) interval after receiving the trigger frame. If the AP were to send multiple trigger frames from each VAP in a conventional, single-user fashion, the UL transmission from each of the STAs would collide with the subsequent trigger frames. Accordingly, MU transmission mechanisms as described currently (and/or future known/discovered/created MU transmission mechanisms) can be leveraged for sending (in some embodiments, aggregated) trigger frames from each BSSID/VAP. An example of MU transmission mechanism technology may be found in co-pending U.S. patent application Ser. No. 17/062,408, the entirety of which is incorporated herein by reference.

FIG. 2B illustrates an example of overlapping TWT SPs 220, 222, and 224, across multiple STAs, at least two of which may be attached to different VAPs (in this example, all the STAs are attached to different VAPs, and the overlap is indicated with dashed lines). The broadcast TWT agreement can be effectuated through broadcasting a beacon containing the relevant TWT parameters/information to all STAs of a group. The beacon frames transmitted at every TBTT (target beacon transmission time) interval refer to periodic transmission from the AP that announce the presence of the AP in the network. A beacon frame may be transmitted in a plurality of wireless communications protocols to enable synchronization of the AP with connected stations. As a non-limiting example, IEEE 802.11 LAN protocols includes the TBTT period to allow STAs within a BSS to synchronize, providing information concerning the capabilities and configuration of the network. To limit air resource contention between devices in the communications network, the elapsed time of the SPs of a given session should not be greater than the elapsed time of the TBTT period. The TBTT period comprises the elapsed time in between beacon frames. A multi-VAP trigger 226 can be transmitted, followed by a UL-OFDMA QoS Null frame 228, which in turn is followed by a multi-VAP multi-STA block ACK (BA) frame 230, after which, e.g., a DL MU transmission of data 232 can commence/progress. It should be noted that the DL MU transmission of data 232 can be effectuated via DL OFDMA or MU-MIMO transmission schemes.

Figure 3A:
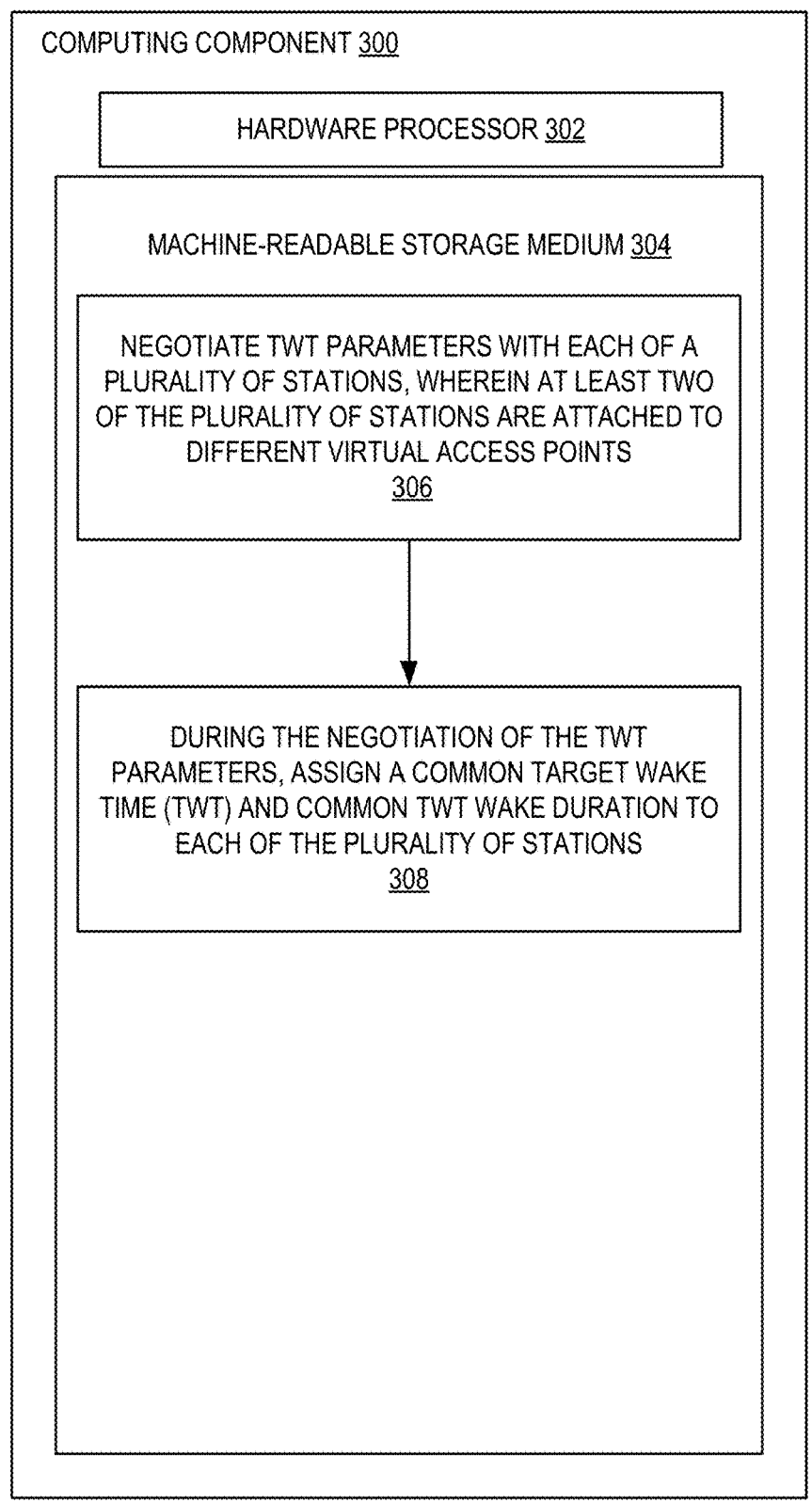
FIG. 3A illustrates an example computing component for effectuating synchronized TWT in accordance with one embodiment.

FIG. 3A is a block diagram of an example computing component or device 300 for synchronizing TWT agreements in accordance with one embodiment. Computing component 300 may be, for example, a server computer, a controller, or any other similar computing component capable of processing data. In the example implementation of FIG. 3A, computing component 300 includes a hardware processor, 302, and machine-readable storage medium, 304. In some embodiments, computing component 300 may be an embodiment of a controller, e.g., a controller such as controller 104 (FIG. 1A), or another component of wireless network 100, e.g., an AP such as AP 106a (FIG. 1A), for example.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-308, to control processes or operations for upgrading an AP. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-308.

Hardware processor 302 may execute instruction 306 to negotiate TWT parameters with each of a plurality of STAs, wherein at least two of the plurality of STAs are attached to different VAPs. Unlike the above-described embodiment, where STAs associated to different VAPs are grouped under a single broadcast TWT agreement, in this embodiment, individual TWT agreements can be used. However, similar to the above-described embodiment, the TWT agreements, or more particularly, the TWT parameters reflecting the individual TWT agreements can be made to overlap.

Accordingly, hardware processor 302 may execute instruction 308 to, during the negotiation of the TWT parameters, assign a common TWT and common TWT wake duration to each of the plurality of stations. In this way, multiple STAs across multiple VAPs can simultaneously wake up, and begin transmission/reception of data packets/frames. It should be understood that an AP configured to operate with/as multiple VAPs may use its memory to keep track of TWT parameter negotiations between the AP and the different STAs. For example, machine-readable storage medium 304, in addition to storing instructions 306-308, may store/cache negotiated TWT parameters/TWT parameters that are undergoing negotiation. In this way, the AP is aware of the relevant TWT parameters for each STA (across the same or different VAPs) that ultimately are to be coordinated to create overlapping TWT agreements. As alluded to above, APs and STAs can negotiate TWT parameters, and in doing so, may suggest/request/demand or accept/alternate/dictate/reject certain TWT parameters. For example, and referring back to FIG. 1A, in one embodiment, AP 106c may have negotiated overlapping TWT agreements with STAs 110d and 110f. In order to bring STA 110e in line with the other STAs, AP 106c may demand STA 110e to comport with TWT parameters set forth in the overlapping TWT agreements already established between AP 106c and STAs 110d, and 110f.

Figure 3B:
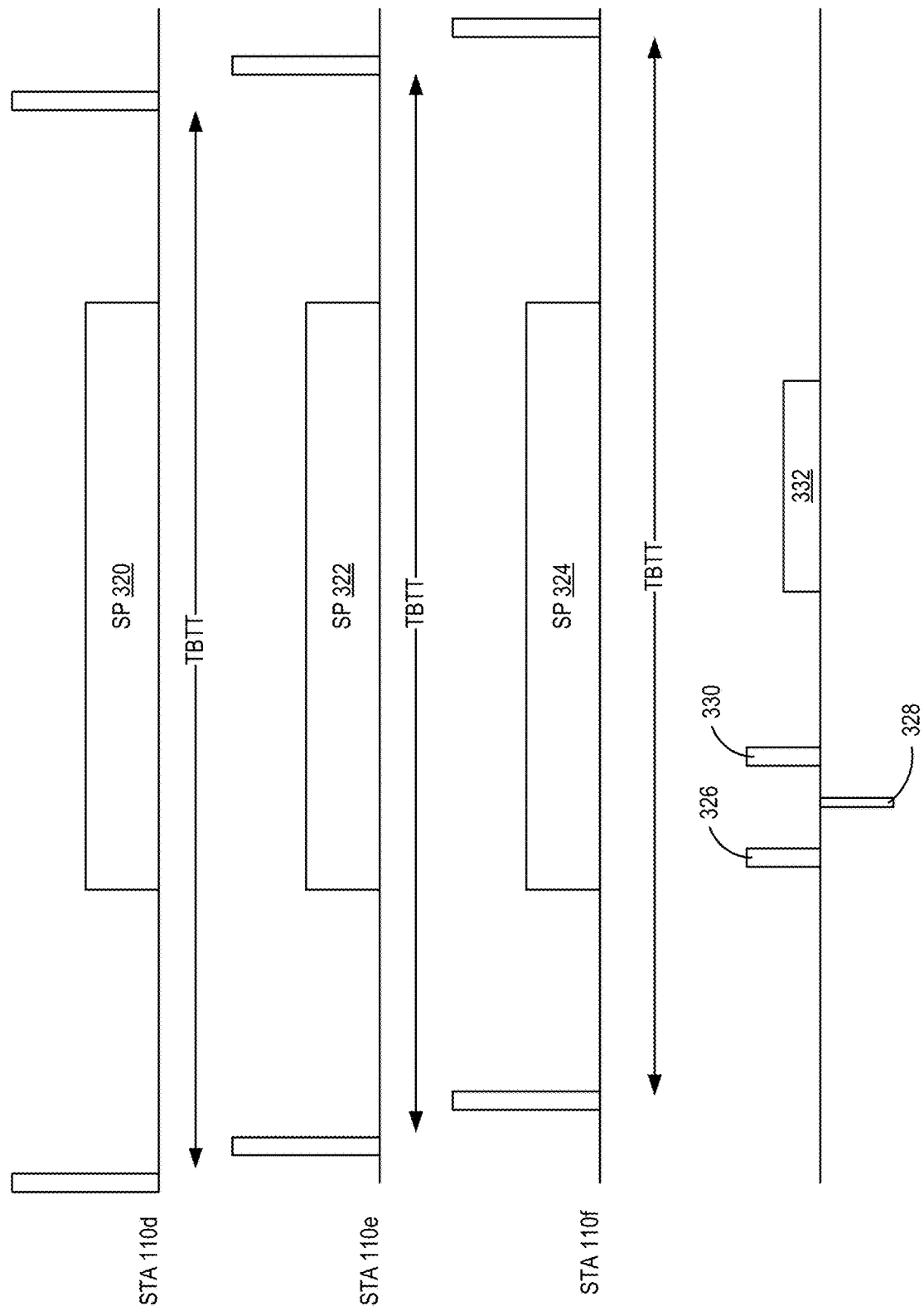
FIG. 3B is an example representation of synchronized TWT in accordance with one embodiment.

FIG. 3B illustrates another example of overlapping TWT SPs 320, 322, and 324, across multiple STAs, at least two of which may be attached to different VAPs. The individual TWT agreements can be effectuated through transmitting a beacon containing the relevant TWT parameters/information to each STA, where at least two of the STAs, e.g., STA 110d and 110e, may be associated with different VAPs. A multi-VAP trigger 326 can be transmitted, followed by a UL-MU QoS Null frames 328, which in turn is followed by a multi-VAP multi-STA block ACK (BA) frame 330, after which, e.g., a DL MU transmission of data 332 can commence/progress.

Figure 4A:
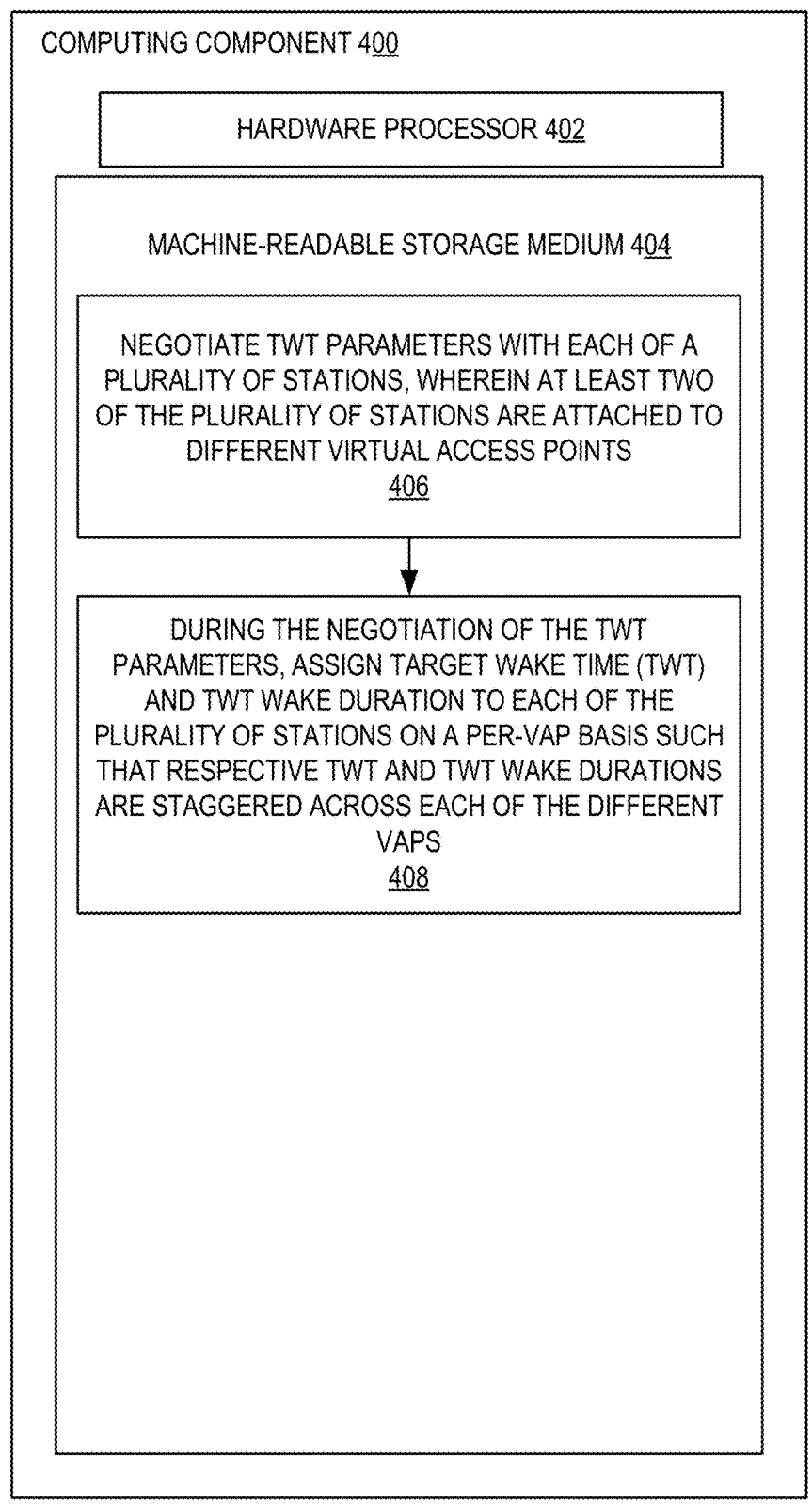
FIG. 4A illustrates an example computing component for effectuating synchronized TWT in accordance with one embodiment.

FIG. 4A is a block diagram of an example computing component or device 400 for synchronizing TWT agreements in accordance with one embodiment. Computing component 400 may be, for example, a server computer, a controller, or any other similar computing component capable of processing data. In the example implementation of FIG. 4A, computing component 400 includes a hardware processor, 402, and machine-readable storage medium, 404. In some embodiments, computing component 400 may be an embodiment of a controller, e.g., a controller such as controller 104 (FIG. 1A), or another component of wireless network 100, e.g., an AP such as AP 106a (FIG. 1A), for example.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-408, to control processes or operations for upgrading an AP. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 404 may be encoded with executable instructions, for example, instructions 406-408.

Hardware processor 402 may execute instruction 406 to negotiate TWT parameters with each of a plurality of STAs, wherein at least two of the plurality of STAs are attached to different VAPs. In this embodiment, TWT agreements can be promulgated as broadcast TWT agreements and/or as individual TWT agreements. For example, in some embodiments, e.g., in the case of large numbers of STAs being supported across different VAPs on the same AP radio, contention can be avoided/mitigated by staggering unrelated TWT agreements. Hence, a TWT agreement negotiated for a first VAP can be made to not fully or partially overlap that associated with a second VAP. It should be noted that staggering TWT in this manner can also reduce the amount of time STAs need to remain awake. This staggering between TWT agreements can combine all individual, all broadcast or a mix of both types of TWT agreement.

Accordingly, hardware processor 402 may execute instruction 408 to, during the negotiation of the TWT parameters, assign a TWT and TWT wake duration to each of the plurality of stations on a per-VAP basis such that respective TWT and TWT wake durations are staggered across each of the different VAPs. As discussed above, it should be understood that an AP configured to operate with/as multiple VAPs may use its memory to keep track of TWT parameter negotiations between the AP and the different STAs and/or per-VAP groups of STAs. For example, negotiated TWT parameters corresponding to particular VAPs can be stored/cached so the AP can be aware of, e.g., TWT SPs and can compute other TWT SPs to not overlap with those that have already been negotiated.

FIG. 4B illustrates an example of staggered TWT SPs 420, 422, and 424, across multiple STAs. For example, in this scenario, STA 110d is attached to a first VAP, STA 110e is attached to a second VAP, and STA 110f is attached to a third VAP. Broadcast TWT agreements can be effectuated through transmission of a beacon containing the relevant TWT parameters/information to each STA of a group of STAs attached to a particular VAP. Alternatively, individual TWT agreements can be effectuated as well. Here, the SPs 420, 422, and 424 do not overlap. It should be noted that not all STAs need to either be staggered or overlapping. That is, in some scenarios various embodiments account for some set(s) of STAs having overlapping SPs, while another set(s) of STAs may have staggered SPs. For example, referring to FIG. 4B, instead of having STAs 110d and 110e staggered in terms of SPs, SPs 420 and 422 may overlap (shown using hashed lines), while SP 424 is staggered relative to SPs 420 and 422.

As alluded to above, various types of TWT agreements or TWT agreement operating modes can be realized in accordance with various embodiments. TWT agreements may be a combination of announced/unannounced and trigger-enabled/non trigger-enabled. For example, in some embodiments, a TWT agreement can be unannounced and non-trigger enable. In accordance with this type of TWT agreement, a STA is expected to be awake at the negotiated TWT wake time. Hence an AP can start downlink transmissions to STAs immediately. In some embodiments, a TWT agreement can be unannounced and trigger-enabled, in which case, and again, a STA(s) is expected to be awake at the negotiated TWT wake time, and an AP can start downlink transmissions right away. Uplink transmissions can be based on MU mechanisms, pursuant to receipt by a STA of a trigger from the AP. In some embodiments, a TWT agreement can be announced and trigger-enabled. In such embodiments, DL transmission may commence only after a STA informs the AP of its wake state. In still other embodiments TWT agreements can be announced and non trigger-enabled, in which case, DL transmission again can only start after STAs inform the AP of their respective wake states. Moreover, UL transmission can begin by STAs simply commencing with transmission—they do not have wait for an AP trigger to begin.

Figure 5:
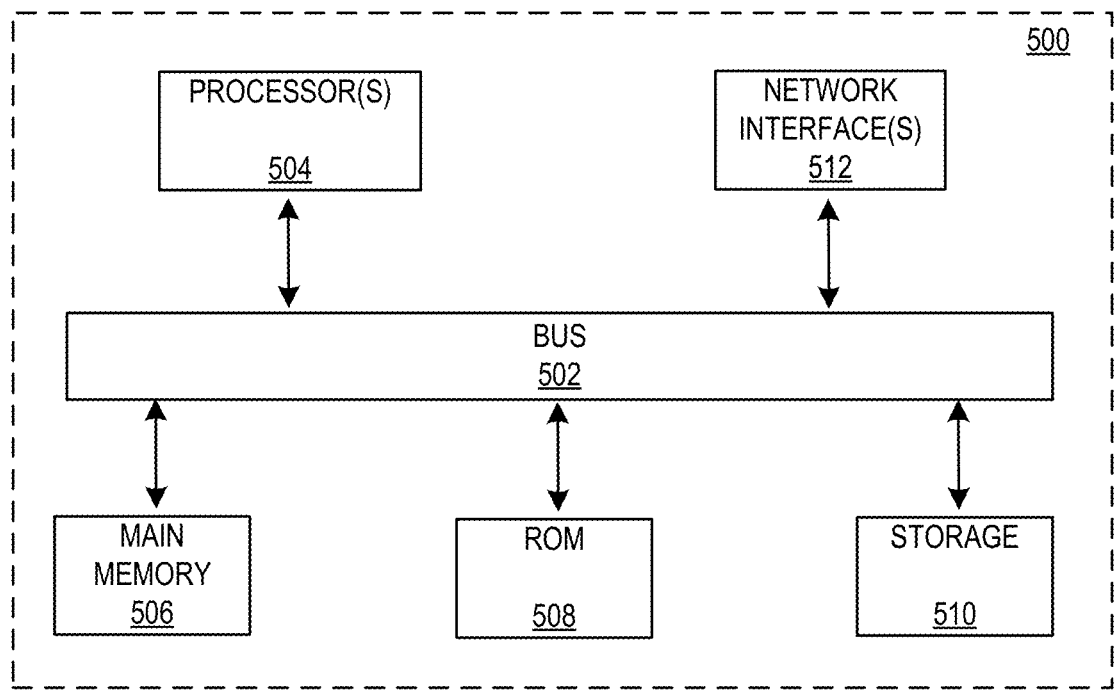
FIG. 5 illustrates an example computing component in which various embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may further include at least one network interface 512, such as a network interface controller (NIC), network adapter, or the like, or a combination thereof, coupled to bus 502 for connecting computer system 500 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a processor; and
   a memory operatively connected to the processor, and including computer code that when executed, causes the processor to:
   group a plurality of stations, at least two of which are attached to different virtual access points (VAPs); and
   negotiate with each of the plurality of stations of the group, a target wake time (TWT) agreement comprising a TWT service period (SP) that overlaps for each of the plurality of stations of the group.

2. The system of claim 1, wherein the memory includes computer code that when executed further causes the processor to group the plurality of stations based on the plurality of stations having the same or similar traffic pattern.

3. The system of claim 1, wherein the memory includes computer code that when executed begins downlink transmissions from each of the VAPs without waiting for wake state indications from the plurality of stations when the negotiated TWT agreement comprises an unannounced TWT agreement.

4. The system of claim 1, wherein the memory includes computer code that when executed begins downlink transmissions from each of the VAPs only upon receipt of wake state indications from the plurality of stations when the negotiated TWT agreement comprises an announced TWT agreement.

5. The system of claim 1, wherein the memory includes computer code that when executed receives uplink transmissions from each of the VAPs without transmitting a trigger to the plurality of stations when the negotiated TWT agreement comprises a non-trigger enabled TWT agreement.

6. The system of claim 1, wherein the memory includes computer code that when executed receives uplink transmissions from each of the VAPs subsequent to transmitting a trigger to the plurality of stations when the negotiated TWT agreement comprises a trigger enabled TWT agreement.

7. The system of claim 1, wherein the memory includes computer code that when executed effectuates downlink and uplink transmissions to and from each of the plurality of stations associated with the same VAP, respectively, in accordance with a multi-user (MU) transmission mechanism.

8. A system, comprising:
a processor; and
a memory operatively connected to the processor, and including computer code that when executed, causes the processor to:
negotiate target wake time (TWT) parameters with each of a plurality of stations, wherein at least two of the plurality of stations are attached to different virtual access points (VAPs); and
during the negotiation of the TWT parameters, assign a TWT and TWT wake duration to each of the plurality of stations, wherein the TWT and TWT wake duration are common amongst each of the plurality of stations.

9. The system of claim 8, wherein the memory includes computer code that when executed further causes the processor to group the plurality of stations based on the plurality of stations having the same or similar traffic pattern.

10. The system of claim 8, wherein the memory includes computer code that when executed begins downlink transmissions from each of the different VAPs without waiting for wake state indications from the plurality of stations when the negotiated TWT parameters comprise an unannounced TWT agreement.

11. The system of claim 8, wherein the memory includes computer code that when executed begins downlink transmissions from each of the different VAPs only upon receipt of wake state indications from the plurality of stations when the negotiated TWT parameters comprise an announced TWT agreement.

12. The system of claim 8, wherein the memory includes computer code that when executed receives uplink transmissions from each of the VAPs without transmitting a trigger to the plurality of stations when the negotiated TWT parameters comprise a non-trigger enabled TWT agreement.

13. The system of claim 8, wherein the memory includes computer code that when executed receives uplink transmissions from each of the VAPs subsequent to transmitting a trigger to the plurality of stations when the negotiated TWT parameters comprise a trigger enabled TWT agreement.

14. The system of claim 8, wherein the memory includes computer code that when executed effectuates downlink and uplink transmissions to and from each of the plurality of stations associated with the same VAP, respectively, in accordance with a multi-user (MU) transmission mechanism.

15. A system, comprising:
a processor; and
a memory operatively connected to the processor, and including computer code that when executed, causes the processor to:
negotiate target wake time (TWT) parameters with each of a plurality of stations, wherein at least two of the plurality of stations are attached to different virtual access points (VAPs); and
during the negotiation of the TWT parameters, assign a TWT and a TWT wake duration to each of the plurality of stations on a per-VAP basis such that respective TWT and TWT wake durations are staggered across each of the different VAPs.

16. The system of claim 15, wherein the memory includes computer code that when executed further causes the processor to group the plurality of stations based on the plurality of stations having the same or similar traffic pattern.

17. The system of claim 15, wherein the memory includes computer code that when executed begins downlink transmissions from each of the different VAPs without waiting for wake state indications from the plurality of stations when the negotiated TWT parameters comprise an unannounced TWT agreement.

18. The system of claim 15, wherein the memory includes computer code that when executed begins downlink transmissions from each of the different VAPs only upon receipt of wake state indications from the plurality of stations when the negotiated TWT parameters comprise an announced TWT agreement.

19. The system of claim 15, wherein the memory includes computer code that when executed receives uplink transmissions from each of the VAPs without transmitting a trigger to the plurality of stations when the negotiated TWT parameters comprise a non-trigger enabled TWT agreement.

20. The system of claim 15, wherein the memory includes computer code that when executed receives uplink transmissions from each of the VAPs subsequent to transmitting a trigger to the plurality of stations when the negotiated TWT parameters comprise a trigger enabled TWT agreement.

* * * * *